United States Patent

[11] 3,592,156

[72] Inventor Otakar P. Prachar
 Santa Barbara, Calif.
[21] Appl No 31,086
[22] Filed Apr. 23, 1970
[45] Patented July 13, 1971
[73] Assignee General Motors Corporation
 Detroit, Mich.

[54] OMNIDIRECTIONAL SENSOR
 8 Claims, 3 Drawing Figs.
[52] U.S. Cl............................................... 116/114,
 73/492, 200/61.45
[51] Int. Cl............................................ G01d 21/00
[50] Field of Search.... 116/114,
 114.29; 73/514, 492, 11, 12; 200/61.45, 61.5

[56] References Cited
 UNITED STATES PATENTS

| | | | |
|---|---|---|---|
| 2,683,194 | 7/1954 | Mathisen | 200/61.45 |
| 3,070,675 | 12/1962 | Domek | 200/61.45 |
| 3,418,964 | 12/1968 | Peterson | 116/114 AH |
| 3,457,382 | 7/1969 | Boswell | 200/61.45 |

*Primary Examiner* —Louis J. Capozi
*Attorneys* — W. E. Finken and Herbert Furman ABSTRACT: An omnidirectional sensor includes a tubular guide slidably receiving an operator which is biased from a nonactuated position to an actuated position. The operator includes an axial bore opening to three radial bores, each of which receives a respective ball. A headed control rod projects within the axial bore and engages the balls to force the balls outwardly of the radial bores and into engagement with a radial shoulder of the guide to locate the operator in nonactuated position. A seismic mass seats on one end of the guide and engages the head of the control rod under a predetermined resilient bias. Movement of the mass under an acceleration pulse of predetermined amplitude and time overcomes the resilient bias and moves the control rod outwardly of the axial bore to permit the balls to move inwardly of the radial bores and out of engagement with the guide shoulder to release the operator. The sensor is reset by moving the operator against its bias from actuated position to nonactuated position so that the control rod projects within the axial bore and forces the balls outwardly of the radial bores into engagement with the guide shoulder.

PATENTED JUL 13 1971 3,592,156
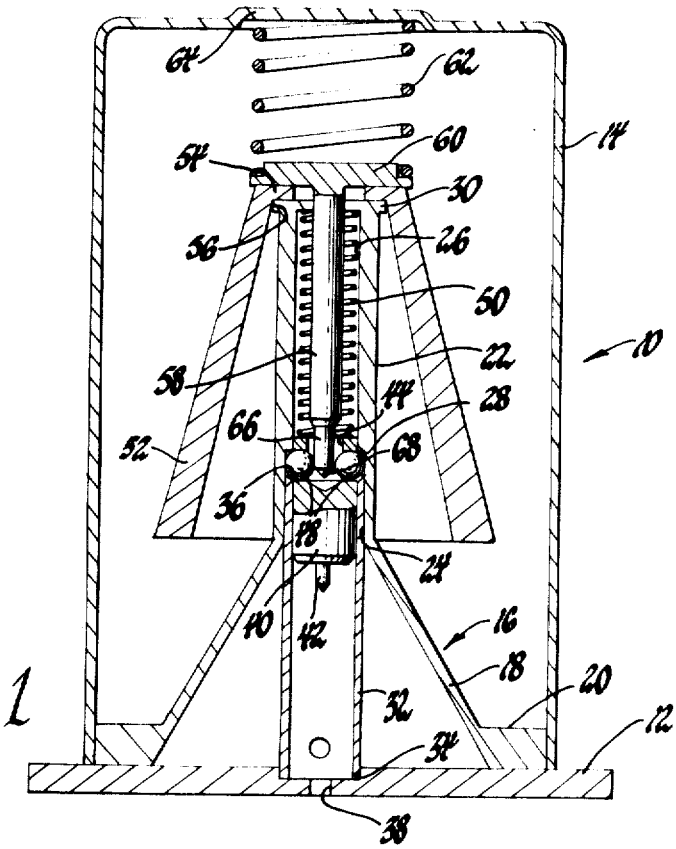
Fig.1
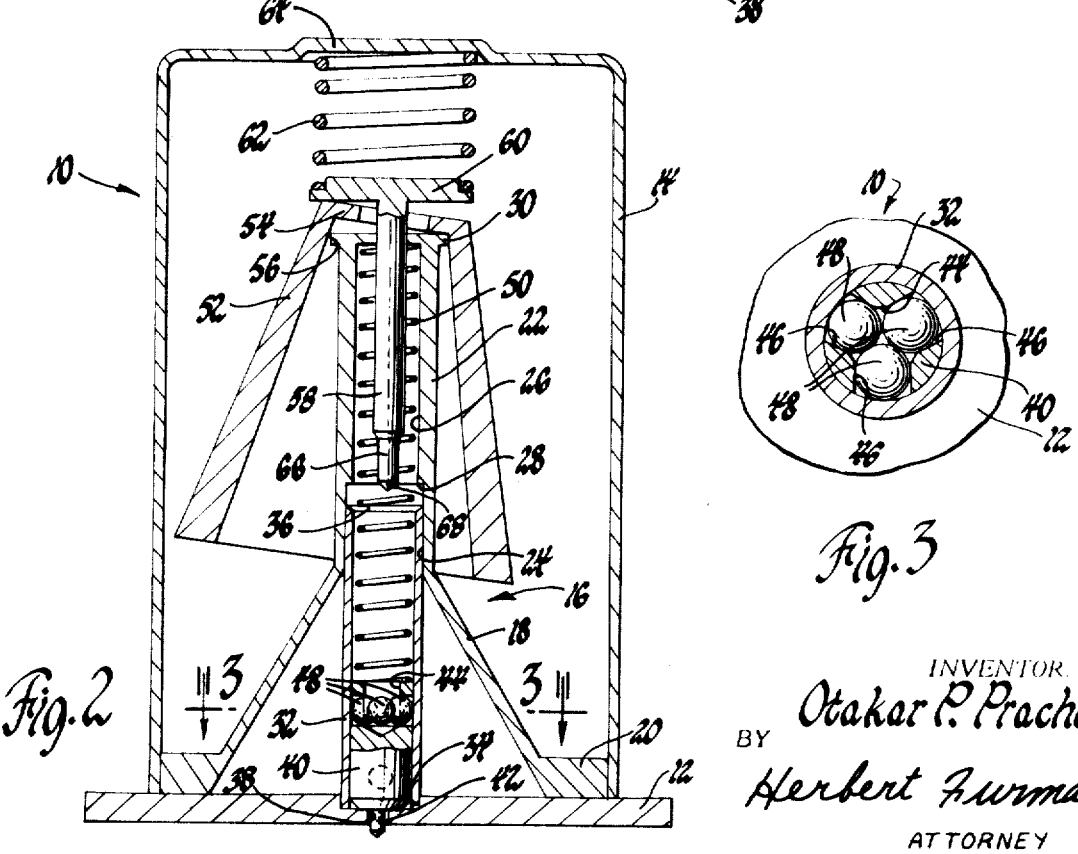
Fig.2
Fig.3
INVENTOR.
Otakar P. Prachar
BY Herbert Furman
ATTORNEY

OMNIDIRECTIONAL SENSOR

This invention relates to sensors for sensing acceleration pulses and releasing an operator for movement from nonactuated to actuated positions when subjected to an acceleration pulse of predetermined amplitude and time and more particularly to such sensors which can be externally reset without disassembly.

One of the features of this invention is that the sensor includes an operator which is biased to an actuated position and held in nonactuated position by detent means releasable by seismic mass actuated means and with the detent means being reengageable to reset the sensor by movement of the operator externally of the sensor from actuated position to nonactuated position. Another feature of this invention is that the detent means includes a plurality of balls carried by the operator and engageable therewith and with a stationary portion of the sensor, with the balls being movable with the operator when the balls are released from engagement with the stationary portion of the sensor by the seismic mass actuated means. A further feature of this invention is that the operator moves axially of the sensor and has a plurality of radial passages, each of which receives a respective ball, with the balls engaging the passage walls and being held in engagement with a radial shoulder of a stationary support by a seismic mass controlled member to retain the operator in nonactuated position. Yet another feature of this invention is that the control member moves axially relative to the radial passages of the operator and tangentially engages the balls to hold the balls in engagement with the radial shoulder of the support. Yet a further feature of this invention is that the seismic mass moves the control rod out of tangential engagement with the balls to permit the balls to move with the operator to actuated position.

Still a further feature of this invention is that movement of the operator from actuated to nonactuated position moves the balls into tangential engagement with the control member to force the balls outwardly of the radial passages and into engagement with the radial shoulder of the stationary support to reset the sensor by retaining the operator in nonactuated position. Yet another feature of this invention is that it provides an omnidirectional sensor which includes a generally frustoconical shaped seismic mass releasing an operator for movement from nonactuated to actuated position when subjected to an acceleration pulse of predetermined amplitude and time.

These and other features of the sensor of this invention will be readily apparent from the following specification and drawings wherein:

FIG. 1 is a sectional view of the sensor in nonactuated position;

FIG. 2 is a similar view showing the sensor in actuated position; and

FIG. 3 is an enlarged sectional view taken generally along the plane indicated by line 3–3 of FIG. 2.

Referring now to the drawings, the sensor designated generally 10 includes a cylindrical baseplate 12 and a cylindrical housing 14 having its open end seated on the plate 12 and suitably secured thereto. A support 16 includes a frustoconically shaped portion 18 terminating in an enlarged cylindrical flange 20 which engages both the housing 14 and the baseplate 12 and is secured to the latter in a conventional manner. The support further includes a cylindrical tubular portion 22 having a bore 24 and a bore 26 of reduced diameter which cooperatively define a radial shoulder 28. The tubular portion 22 terminates in an apertured cylindrical end wall or flange 30.

A cylindrical guide tube 32 has one end thereof seating in a counterbore 34 of the baseplate 12 and the other end thereof slidably received within the bore 24 of the portion 22 of support 16. As clearly shown in FIG. 2, the other end of the guide tube terminates in a radially tapered shoulder or abutment 36. The one end of the guide tube opens outwardly of the baseplate 12 through an aperture 38 therein for a purpose to be hereinafter described.

A cylindrical operator 40 is slidably housed within the guide tube 32 and includes a pointed end pin 42 extending axially of one end thereof. An axial bore 44 in the other end of the operator opens to three equally spaced radial bores 46 as clearly shown in FIG. 3. A ball 48 is slidably received in each bore 46, with the diameter of the balls being generally equal to that of the respective bores. A coil compression spring 50 seats between the flange 30 and the other end of the operator 40 to normally bias the operator to its actuated position as shown in FIG. 2.

A generally frustoconically-shaped seismic mass 52 includes an apertured cylindrical end wall or flange 54, the inner surface of which seats on the outer surface of flange 30. The OD of the outer surface flange 30 is generally equal to the OD of the inner surface of flange 54 of the seismic mass 52 to locate the mass against sliding movement radially of the flange 30 but permit tilting movement of the mass 52 relative to the flange 30 and support as shown in FIG. 2 and as will be hereinafter described. A control member or pin 58 includes a cylindrical stepped head or flange 60 which seats on the outer surface of flange 54 of the seismic mass. A compression spring 62 of predetermined strength seats on the flange 60 and an embossment 64 of the housing 14 to normally seat flange 60 against flange 54 and in turn seat flange 54 against flange 30, as shown in FIG. 1. The control pin 58 projects inwardly of the tubular portion 22 of the support through the apertures of flanges 54 and 30 and through spring 26. The diameter of the aperture of flange 54 is much larger than the OD of pin 58 while the diameter of the aperture of flange 30 is generally equal to that of the OD of pin 58 to act as a guide for the pin as will be described. The reduced diameter extension 66 of the control pin projects within the axial bore 44 of the operator 40 when the operator is in its nonactuated position as shown in FIG. 1 to tangentially engage the balls 48 and force the balls outwardly of the radial bores 46 and into engagement with the shoulder 36 of guide tube 32. The tangential engagement of the balls with shoulder 36 and the walls of bores 46 holds the operator 40 in its nonactuated position shown in FIG. 1 against the bias of the spring 26.

The force of spring 62 and the weight of the mass 52 are set such that the mass 52 will normally remain stationary or tilt very slightly with respect to flange 30 under acceleration pulses below a predetermined amplitude and time. Should an acceleration pulse of predetermined amplitude and time be applied to the seismic mass 52, it will tilt relative to the flange 30, as shown in FIG. 2, against the action of the spring 62. This will axially move the control pin 58 upwardly due to the engagement of flange 54 with flange 60 and in turn move the extension 66 of the control pin axially outwardly relative to the bore 44. As soon as the extension 66 has moved through an integrating distance equal to the axial distance between the radial plane of tangency of balls 48 with extension 66 and a radial plane through the base of the pointed end 68 of the extension 66, the balls 48 move inwardly of the radial bores 46 under the action of the spring 50 so that the operator 40 is released for movement under the action of such spring to actuated position shown in FIG. 2. The enlarged aperture of the flange 54 permits the seismic mass 52 to tilt relative to the control pin 58 without cocking or tilting such pin. The aperture of flange 30 guides the axial movement of the pin 58 and likewise aids in preventing any tilting movement of the pin when the seismic mass tilts.

The balls 48 move with the operator 40 and are located in tangential engagement with each other and with the inner surface of the guide tube 32 during movement of the operator to actuated position and in such position as shown in FIG. 3. This permits the sensor to be reset. In order to reset the sensor, one need only engage the pointed end of the pin 42 with a suitable rod and force the operator 40 upwardly of the guide tube 32 against the action of spring 50. When the balls 48 engage the end 68 of the control pin to force the pin 58 slightly upwardly against spring 62 until the bores 46 open to bore 24, spring 62 then moves the pin 58 downwardly to its FIG. 1 position to force the balls 48 outwardly of the bores and into engagement with both the walls of the bores and the shoulder 36 of the guide tube to retain the operator in nonactuated position.

The sensor 10 of this invention is specifically intended for use in a vehicle air cushion restraint system. Such a system may include a fluid-filled pressure vessel sealed by a rupturable diaphragm, an inflatable bag or cushion, and a manifold connecting the vessel and the cushion. The pin 42 may either directly rupture the diaphragm, actuate a detonator to rupture the diaphragm, or initiate rupture of the diaphragm by closing a switch to electrically fire a squib or detonator which ruptures the diaphragm, to thereby release the contents of the pressure vessel and inflate the cushion when the vehicle is subjected to conditions which apply an acceleration pulse of predetermined amplitude and time to the seismic mass. Such systems may also be of the pure pyrotechnic-type or of the combination pyrotechnic-fluid type and the sensor may be used equally as well in such systems to electrically fire a squib in the vessel and in turn fire the pyrotechnic material.

Although the sensor of this invention includes a generally frustoconically shaped seismic mass which tilts relative to its support, other types of seismic masses which have other modes of movement may likewise be used.

Thus, this invention provides an improved omnidirectional sensor.

I claim:

1. An omnidirectional sensor comprising, a support including an axial guide, an operator mounted on the guide for axial movement relative thereto, resilient means biasing the operator to an actuated position, the operator including a generally axial bore and a plurality of radial apertures opening to the bore and to a radial shoulder on the support when the operator is in a predetermined nonactuated axial position, a plurality of balls, each respective to one of the apertures and movable therewithin between a blocking position in engagement with the aperture walls and support radial shoulder to block movement of the operator, and a nonblocking position within the apertures and out of engagement with the support shoulder to permit movement of the balls with the operator to actuated position by the resilient means, a member axially movable into and out of the bore to respectively and alternately engage the balls and force the balls into engagement with the support radial shoulder or release the balls for movement within the apertures, a generally frustoconically shaped seismic mass, means mounting the seismic mass on the support for movement between a normal position wherein the longitudinal axis of the mass is coplanar with a vertical plane normal to the horizontal, and an actuated position wherein the longitudinal axis of the mass and the vertical plane define a predetermined included angle, means exerting a predetermined force maintaining the seismic mass in normal position, means operatively connecting the seismic mass to the axially movable member for selective and alternate movement of the member into and out of the operator bore upon movement of the seismic mass between normal and actuated positions, an acceleration pulse of predetermined amplitude and time overcoming the predetermined force and moving the seismic mass to actuated position to move the axially movable member out of the operator bore and release the operator for movement to actuated position.

2. An omnidirectional sensor comprising, a support including an axial guide, an operator mounted on the guide for axial movement relative thereto, resilient means biasing the operator to an actuated position, the operator including a generally axial bore and a plurality of radial apertures opening to the bore and to a radial shoulder on the support when the operator is in a predetermined nonactuated axial position, a plurality of balls, each respective to one of the apertures and movable therewithin between a blocking position in engagement with the aperture walls and support radial shoulder to block movement of the operator, and a nonblocking position within the apertures and out of engagement with the support shoulder to permit movement of the operator to actuated position by the resilient means, a member axially movable into and out of the bore to respectively and alternately engage the balls and force the balls outwardly of the apertures into engagement with the support radial shoulder or release the balls for movement within the apertures, a generally frustoconically shaped seismic mass having a generally planar portion thereof seated in coplanar relationship on a planar portion of the support, means operatively connecting the mass to the axially movable member for selective and alternate movement of the member into and out of the operator bore upon movement of the seismic mass planar portion into and out of coplanar relationship with the support planar portion, and means exerting a predetermined force seating the seismic mass planar portion on the support planar portion, an acceleration pulse of predetermined amplitude and time moving the seismic mass planar portion out of coplanar relationship with the support planar portion and against the action of the predetermined force means to move the member out of the bore and release the operator.

3. An omnidirectional sensor comprising, a support including an axial guide, an operator mounted on the guide for axial movement relative thereto, resilient means biasing the operator to an actuated position, the operator including a generally axial bore and a plurality of radial apertures opening to the bore and to a radial shoulder on the support when the operator is in a predetermined nonactuated axial position, a plurality of balls, each respective to one of the apertures and movable therewithin between a blocking position in engagement with the aperture walls and support radial shoulder to block movement of the operator, and a nonblocking position within the apertures and out of engagement with the support shoulder to permit movement of the operator to actuated position by the resilient means, a member axially movable into and out of the bore to respectively and alternately engage the balls and force the balls outwardly of the apertures into engagement with the support radial shoulder or release the balls for movement within the apertures, a generally frustoconically shaped seismic mass having a generally planar one end portion thereof seated on a planar portion of the support, means operatively connecting the mass to the axially movable member for selective and alternate movement of the member into and out of the operator bore upon movement of the seismic mass end portion into and out of coplanar relationship with the support planar portion, and means exerting a predetermined force seating the seismic mass end portion against the support planar portion, an acceleration pulse of predetermined amplitude and time moving the seismic mass end portion out of coplanar relationship with the support planar portion and against the action of the predetermined force means to move the member out of the bore and release the operator.

4. An omnidirectional sensor comprising, a support including an axial guide, an operator mounted on the guide for axial movement relative thereto, resilient means biasing the operator to an actuated position, the operator including a generally axial bore and a plurality of radial apertures opening to the bore and to a radial shoulder on the support when the operator is in a predetermined nonactuated axial position, a plurality of balls, each respective to one of the apertures and movable therewithin between a blocking position in engagement with the aperture walls and support radial shoulder to block movement of the operator, and a nonblocking position within the apertures and out of engagement with the support shoulder to permit movement of the operator to actuated position by the resilient means, an axially movable member having a flange at one end thereof and the other end thereof movable into and out of the bore to respectively and alternately engage the balls and force the balls into engagement with the support radial shoulder or release the balls for movement within the apertures, a generally frustoconically shaped seismic mass having an apertured planar flange at one end thereof receiving the axially movable member therethrough and seated on a planar portion of the support, the member flange overlying the seismic mass flange to operatively connect the mass to the axially movable member for selective and alternate movement of the member into and out of the operator bore upon movement of the seismic mass flange into and out of coplanar relationship with the support planar portion, and means exerting a predetermined force on the member flange seating the seismic mass flange against the support planar portion, an acceleration pulse of predetermined amplitude and time moving the seismic mass flange out of coplanar relationship with the support planar portion and against the action of the predetermined force means to move the other end of the member out of the bore and release the operator.

5. A sensor comprising, a support including an axial guide, an operator mounted on the guide for movement between first and second positions relative to the support, detent means movable between detented and undetented positions and engageable in detented position with the operator and support to hold the operator in the first position relative to the support, a seismic mass having a planar one end seated on a planar portion of the support, the seismic mass being movable between a normal seated position on the planar portion of the support and an actuated position wherein the planar one end of the mass is located at a predetermined angle to the planar portion of the support, means exerting a predetermined force seating the planar end of the mass on the support to maintain the mass in normal seated position, an acceleration pulse of predetermined amplitude and time overcoming the predetermined force and moving the seismic mass to actuated position, and means operatively connecting the seismic mass to the detent means for moving the detent means to undetented position upon movement of the seismic mass from normal position to actuated position to release the operator.

6. A sensor comprising, a support including an axial guide, an operator mounted on the guide for movement between first and second positions relative to the support, ball means mounted on the operator for movement between detented and undetented positions and engageable in detented position with the operator and support to hold the operator in the first position relative to the support, a seismic mass having a planar one end seated on a planar portion of the support, the seismic mass being movable between a normal seated position on the planar portion of the support and an actuated unseated position wherein the planar end of the mass is located at a predetermined angle to the planar portion of the support, means exerting a predetermined force seating the planar end of the mass on the support to maintain the mass in normal seated position, an acceleration pulse of predetermined amplitude and time overcoming the predetermined force and moving the seismic mass to actuated position, and means operatively connecting the seismic mass to the ball means for moving the ball means to undetented position upon movement of the seismic mass from normal position to actuated position.

7. An omnidirectional sensor comprising, a support including a hollow axial guide and a radial shoulder, an operator mounted within the guide for movement axially thereof between first and second positions relative to the support, a plurality of balls slidably mounted on the operator for movement radially outwardly thereof to detented position and engageable in detented position with the radial shoulder of the support and the operator to hold the operator in the first position, a seismic mass having a planar one end seated on a planar portion of the support, the seismic mass being movable between a normal seated position wherein the one end of the mass is coplanar with the planar portion of the support and an actuated position wherein the one end of the mass is located at a predetermined included angle to the planar portion of the support, means exerting a predetermined force seating the one end of the mass on the planar portion of the support to maintain the seismic mass in normal position, an acceleration pulse of predetermined amplitude and time overcoming the predetermined force and moving the seismic mass to actuated position, and ball control means mounted on the support and engageable with the balls to move the balls radially outwardly of the operator to detented position and means for moving the ball control means out of engagement with the balls upon movement of the seismic mass from normal position to actuated position.

8. A sensor comprising, a support including a hollow annular axial guide and a radial shoulder, an operator mounted within the guide for axial movement relative to the support between first and second positions, resilient means biasing the operator to second position, the operator including a plurality of radial passages opening to the radial shoulder of the support when the operator is in the first position, a plurality of balls, each respective to one of the passages and movable therein between a detented position in engagement with the support shoulder to block movement of the operator to second position, and an undetented position within a respective passage out of engagement with the support shoulder to permit movement of the operator to second position by the resilient means, a control member movable axially of the balls and engageable therewith to force the balls into engagement with the support radial shoulder or release the balls for movement within the respective passage, a seismic mass mounted on the support for movement relative thereto, means operatively connecting the mass to the control member to move the member out of engagement with the balls upon movement of the mass relative to the support, and means exerting a predetermined force holding the seismic mass against movement relative to the support, an acceleration pulse of predetermined amplitude and time overcoming the action of the predetermined force and moving the seismic mass relative to the support to move the control member out of engagement with the balls to release the operator.